United States Patent
Pätz

[11] Patent Number: 5,995,272
[45] Date of Patent: Nov. 30, 1999

[54] TRANSPARENT COVER FOR A VEHICLE ROOF

[75] Inventor: Werner Pätz, Hofstetten, Germany

[73] Assignee: Webasto Karosseriesysteme GmbH, Stockdorf, Germany

[21] Appl. No.: 09/090,998

[22] Filed: Jun. 5, 1998

[30] Foreign Application Priority Data

Jun. 5, 1997 [DE] Germany .................. 197 23 596

[51] Int. Cl.⁶ ............................................ G02F 1/15
[52] U.S. Cl. .................... 359/265; 359/275; 359/894
[58] Field of Search ................................ 359/265, 270, 359/273, 275, 894

[56] References Cited

U.S. PATENT DOCUMENTS

| | | | |
|---|---|---|---|
| 4,923,289 | 5/1990 | Demiryont | 359/265 |
| 4,971,308 | 11/1990 | Herlemann et al. | 359/894 |
| 5,206,756 | 4/1993 | Cheshire | 359/270 |
| 5,379,146 | 1/1995 | Defendini | 359/275 |
| 5,604,626 | 2/1997 | Toewee et al. | 359/265 |
| 5,657,149 | 8/1997 | Buffat et al. | 359/275 |
| 5,790,298 | 8/1998 | Tonar | 359/265 |
| 5,838,483 | 11/1998 | Teowee et al. | 359/265 |

FOREIGN PATENT DOCUMENTS

| | | |
|---|---|---|
| 0 363 045 | 4/1990 | European Pat. Off. . |
| 0 436 283 | 7/1991 | European Pat. Off. . |
| 36 14 547 | 11/1986 | Germany . |
| 36 43 690 | 7/1988 | Germany . |
| 196 30 813 | 3/1997 | Germany . |

*Primary Examiner*—Loha Ben
*Attorney, Agent, or Firm*—Sixbey, Friedman, Leedom & Ferguson; David S. Safran

[57] ABSTRACT

The invention relates to a vehicle roof with a cover (14) having a transparent area, the transparency of which can be controlled by applying a voltage to it. The transparent area has an outwardly arched pane (16) and a flat inner pane (20) located under the outer pane and provided with an electrochromic element (22).

14 Claims, 3 Drawing Sheets

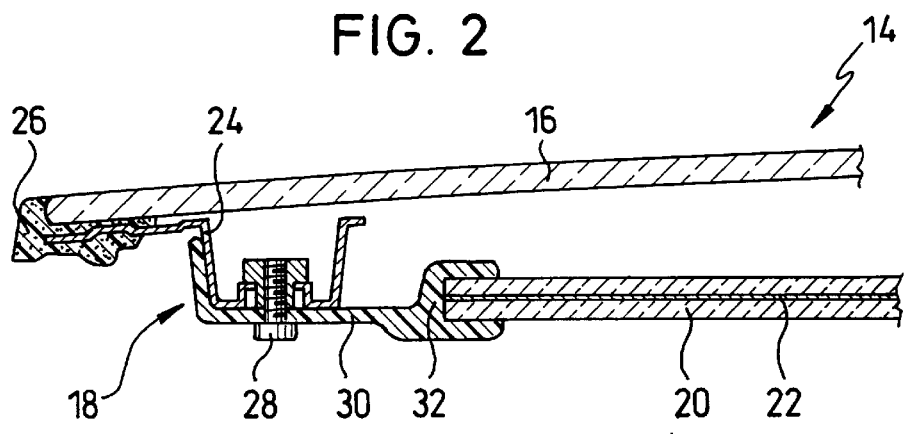
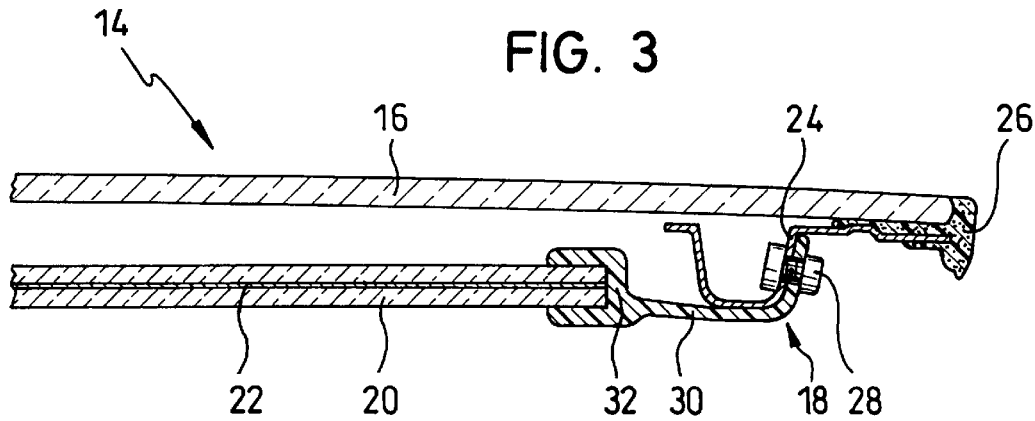

TRANSPARENT COVER FOR A VEHICLE ROOF

BACKGROUND OF THE INVENTION

1. Field of the Invention

The invention relates to a transparent cover for a vehicle roof whose transparency can be controlled by applying voltage.

2. Description of Related Art

Such a vehicle roof is known, for example, from German Patent No. DE 36 14 547 C2. In this known device, the surface of a transparent glass cover has a bottom electrode, an inorganically reducing, color-forming layer, an electrolytic layer with a spacer containing electrolytic solution, an organically oxidizing, color-forming layer, a top electrode and a transparent cover glass laminated or applied on it. This multilayer pane forms the cover of a sun roof and the light incidence in the vehicle interior can be controlled by selectively changing the voltage on the electrodes. For aerodynamic reasons, vehicle roofs are generally made arched outward. Consequently, the transparent area must also be arched. The drawback in the known vehicle roof is that the multilayer cover must be made with the electrochromic area arched, which requires great expense, on the one hand, and, on the other hand, leads to a strong tendency to interference during further processing. Glass breakage leads to a large amount of waste, which makes the costs rise so much that series production was prevented up to now.

Similar vehicle roofs are known from published German Patent Application Nos. DE 36 43 690 C2 and DE 196 30 813 A1, and Published European Patent Application No. EP 0 436 283 A2.

SUMMARY OF THE INVENTION

The primary object of this invention is to overcome the above-mentioned drawbacks and produce a vehicle roof cover with a transparent area that can be controlled by applying voltage.

A further object is to obtain a roof that achieves the above object and is also simple and economical to produce.

These objects are achieved in a transparent cover for a vehicle roof whose transparency can be controlled by applying voltage by the transparent area having an outer, arched pane and a flat, inner pane provided with ay electrochromic element and placed under the outside pane.

The solution according to the invention has the advantage that no coating of arched panes is necessary, the tolerances of the functional surfaces can be manipulated in flat planes relative to one another, waste can be reduced and laboratory results on flat samples are more easily transferred to practice on correspondingly large surfaces.

In an advantageous configuration of the invention, it is provided that the outer pane is made of single-pane or multilayer glass and the inner pane is made of multilayer glass.

Further, it is preferably provided that the mounting frame is made so that the inner pane is detachably connected to the outer pane. This makes it easy to clean the panes.

Here, the mounting frame preferably includes a frame part integrally connected with the outer pane and a holding frame integrally connected with the inner pane, and the frame part and the holding frame are connected to one another detachably, preferably with a screw connection.

These and further objects, features and advantages of the present invention will become apparent from the following description when taken in connection with the accompanying drawings which, for purposes of illustration only, show several embodiments in accordance with the present invention.

BRIEF DESCRIPTION OF THE DRAWINGS

FIG. 2, is a sectional view taken along line 2—2 in FIG. 1;

FIG. 3 is a sectional view taken along line 3—3 in FIG. 1; and

DETAILED DESCRIPTION OF THE PREFERRED EMBODIMENTS

Figure 1:
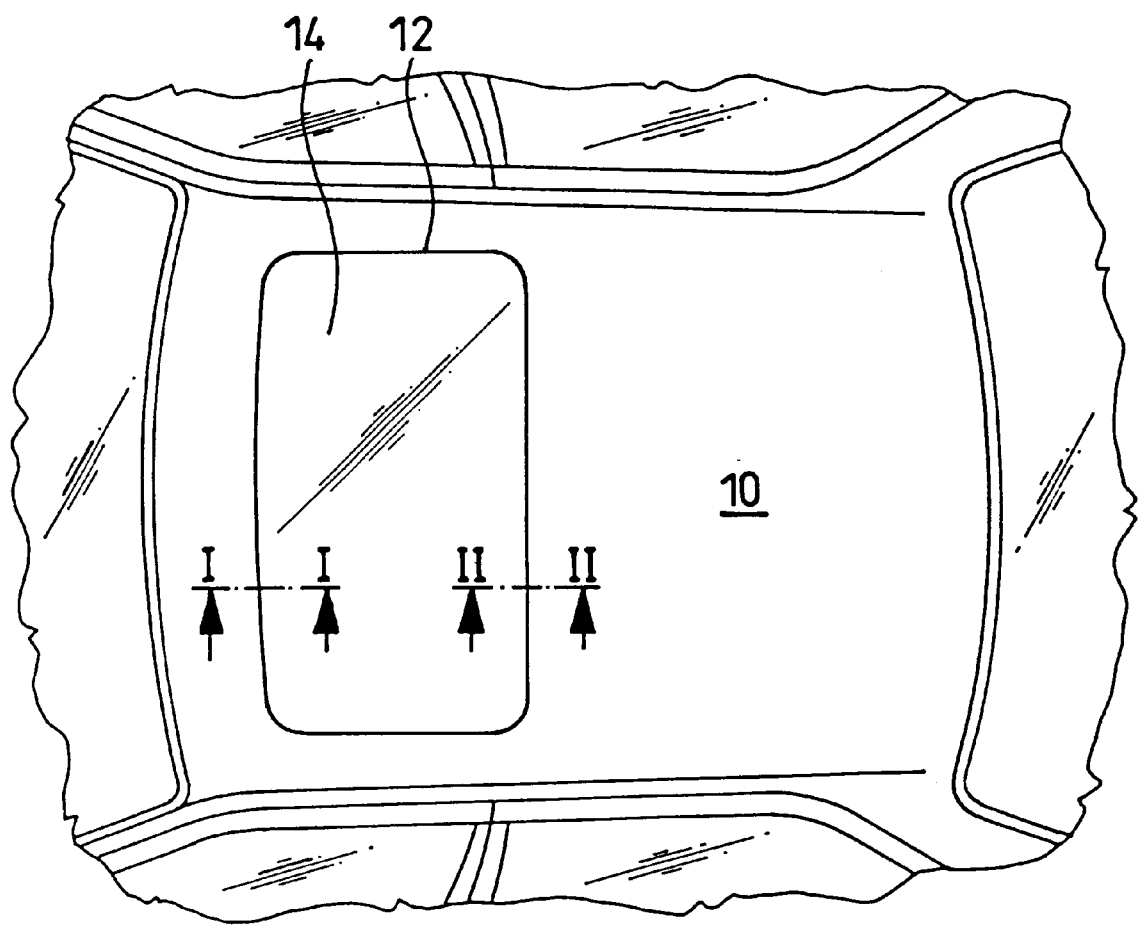
FIG. 1 is a diagrammatic plan view of a vehicle roof.

According to FIG. 1, an opening 12 is made in a fixed roof panel 10 is closed and completely or partially opened by a cover 14. Cover 14 can, for example, be made as a sliding cover, a lifting cover, or a sliding-lifting cover in manners well known in the art and forming no part of this invention.

According to FIGS. 2 and 3, in which only cover 14 is represented, cover 14 comprises a pane 16 that is arched outward and that preferably is made of a single pane of safety glass or a multilayer pane. Cover 14 also comprises a mounting frame 18 and a flat, inner pane 20 that is made of a multilayer pane with an electrochromic element 22. Mounting frame 18 and inner pane 20 are located under outer pane 16. Mounting frame 18 is used to keep inner pane 20 at a specified distance from outer pane 16. The flat design of inner pane 20 simplifies its production considerably, saving costs, reducing waste, and making it easier to be able to transfer laboratory results gained with flat samples to series production of large surfaces.

Mounting frame 18 has a frame part 24 that extends inward from the peripheral area of outer pane 16 that is advantageously made from an inner cover plate that is usually provided, anyway, to attach the cover 14 to the vehicle. Frame part 24 is secured to the underside of the outer pane 16 by injection molding a foamed polyurethane area 26 around it at the edge of outer pane 16. A holding frame 30, preferably made of plastic, forms another part of the mounting frame 18, and it is attached by screws 28 onto the frame part 24. Inner pane 20 is fitted to holding frame 30 in a recess 32 that is U-shaped in cross section, and secured there, for example, with glue. The detachable screw connection between outer pane 16 and inner pane 20 makes it possible to clean the space between the panes 16 and 20.

The transparency of outer pane 16 is selected to be greater than conventional glass roofs and amounts preferably to about 35%. By applying voltage to the electrodes (not shown) provided on the electrochromic element 22, the transparency of the electrochromic element, and thus, of the cover 14, can be changed. For this purpose, an operating element (not shown) is provided in the vehicle interior by which the driver can control the light incidence through cover 14 into the vehicle interior at will. Preferably, inner pane 20 is made so that the overall transparency of the cover 14 can be controlled by up to under 5%.

The inner pane 20 with the electrochromic element 22 can be made in a way known in the art, for example, as is known from German Patents Nos. DE 36 14 547 C2 or DE 36 43 690 C2, or published German Patent Application No. DE 196 30 813 A1, or European Patent Application No. EP 0 363 045, corresponding to U.S. Pat. No. 4,923,289.

Figure 4:
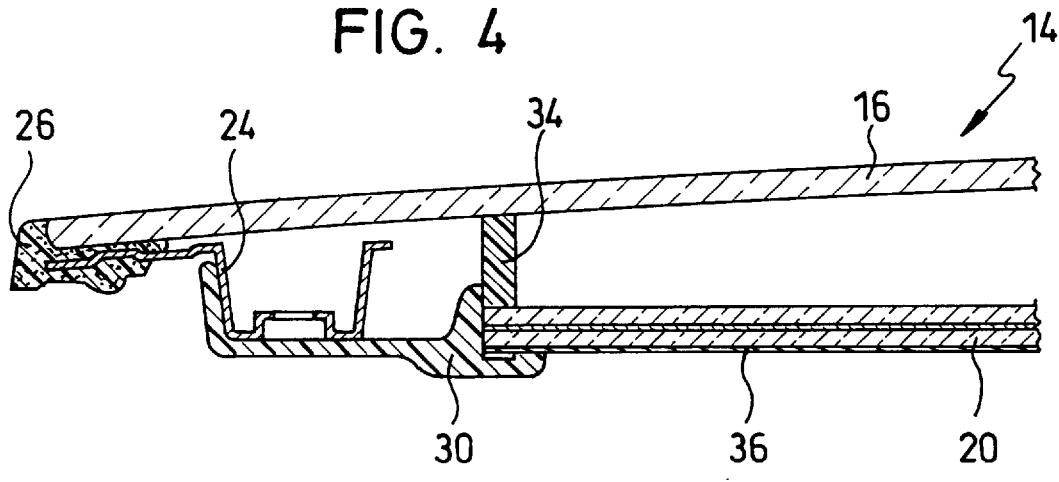
FIGS. 4 & 5 are sectional views corresponding to those of FIG. 2 and FIG. 3 respectively, but showing a modified embodiment.
Figure 5:
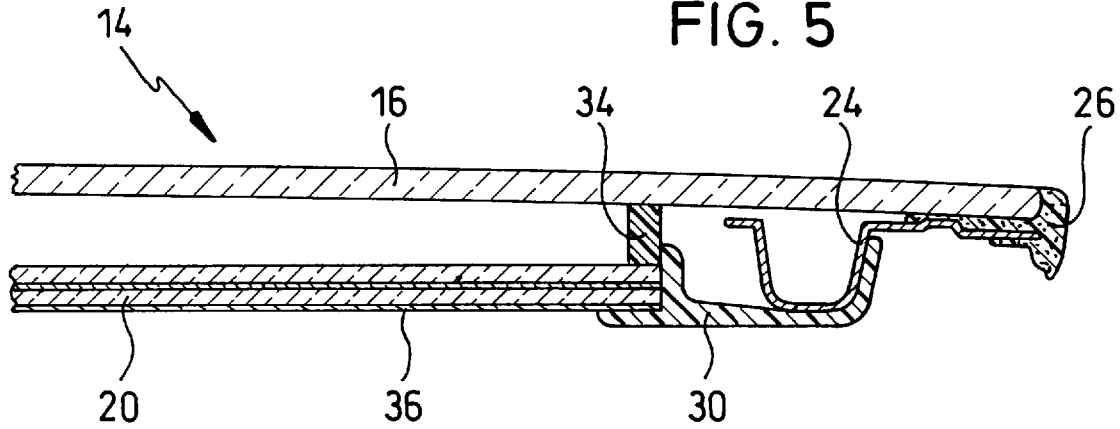

Flat, inner pane 20 with flat electrochromic element 22 can also be attached permanently in the see-through area of cover 14. Such an embodiment is illustrated in FIGS. 4 and 5. Here, frame part 24 (preferably the inner cover plate) and holding frame 30 are integrally connected to one another. In this case, the edge area is hermetically sealed to prevent the penetration of dirt particles into the space between both panes 16 and 20. Systems can be provided for this as they exist in the prior art in insulating glass production for vehicle technology. Thus, FIGS. 4 and 5 show an edge seal 34 preferably made of plastic with a molecular sieve to form insulating multilayer glass. A film 36 to protect against shattering is further indicated on the underside of inner pane 20. Of course, such a film to protect against shattering can also suitably be provided in the embodiment according to FIGS. 2 and 3.

While various embodiments in accordance with the present invention have been shown and described, it is understood that the invention is not limited thereto, and is susceptible to numerous changes and modifications as known to those skilled in the art. Therefore, this invention is not limited to the details shown and described herein, and includes all such changes and modifications as are encompassed by the scope of the appended claims.

We claim:

1. Transparent cover for a vehicle roof with electrochromic element for varying its transparency in response to an application of voltage thereto; wherein the transparent cover comprises an outwardly arched outer pane and a flat inner pane located under the outer pane, the inner pane being provided with said electrochromic element.

2. Cover according to claim 1, wherein the outer pane is made of a single glass pane.

3. Cover according to claim 2, wherein the outer pane is made of a multilayer glass.

4. Cover according to claim 2, wherein the inner pane is made of multilayer glass.

5. Cover according to claim 1, wherein the transparency of the outer pane is about 35%.

6. Cover according to claim 5, wherein the inner pane has a transparency which is adjustable to an extent enabling the overall transparency of the transparent cover to be adjusted to under 5%.

7. Cover according to claim 1, wherein the inner pane is held by a mounting frame.

8. Cover according to claim 7, wherein the mounting frame is connected detachably to the outer pane.

9. Cover according to claim 8, wherein the mounting frame comprises a frame part that is integrally connected to the outer pane and a holding frame connected integrally with the inner pane; and wherein the frame part and the holding frame are detachably connected to one another.

10. Cover according to claim 9, wherein the frame part and the holding frame are attached to one another by screws.

11. Cover according to claim 9, wherein the frame part is attached to the outer pane by a foamed-on polyurethane foam member.

12. Cover according to claim 11, wherein the frame part is made of a shaped sheet material.

13. Cover according to claim 9, wherein the inner pane is fitted to holding frame in a recess that is U-shaped in cross section.

14. Cover according to claim 13, wherein the holding frame is made of plastic.

* * * * *